(12) United States Patent
Mikami et al.

(10) Patent No.: US 9,944,280 B2
(45) Date of Patent: Apr. 17, 2018

(54) VEHICLE CONTROL SYSTEM

(71) Applicant: HONDA MOTOR CO., LTD., Tokyo (JP)

(72) Inventors: Shinji Mikami, Wako (JP); Yoichi Yamashiro, Wako (JP); Yoshikazu Fujimoto, Wako (JP); Shintaro Mito, Wako (JP); Yasuhiro Ohara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/598,451

(22) Filed: May 18, 2017

(65) Prior Publication Data

US 2017/0334437 A1 Nov. 23, 2017

(30) Foreign Application Priority Data

May 19, 2016 (JP) ................................ 2016-100790

(51) Int. Cl.
*B60W 20/50* (2016.01)
*B60K 6/48* (2007.10)
*B60R 16/02* (2006.01)
*B60W 10/06* (2006.01)
*B60W 10/08* (2006.01)
*G05B 23/02* (2006.01)
*G07C 5/08* (2006.01)

(52) U.S. Cl.
CPC .............. *B60W 20/50* (2013.01); *B60K 6/48* (2013.01); *B60R 16/02* (2013.01); *B60W 10/06* (2013.01); *B60W 10/08* (2013.01); *G05B 23/0286* (2013.01); *G07C 5/0808* (2013.01); *B60W 2710/06* (2013.01); *B60W 2710/08* (2013.01); *B60Y 2306/15* (2013.01); *Y10S 903/903* (2013.01)

(58) Field of Classification Search
CPC ...... B60W 20/50; B60W 10/06; B60W 10/08; B60K 6/48; B60R 16/02; G07C 5/0808
USPC .......................................................... 701/22
See application file for complete search history.

(56) References Cited

U.S. PATENT DOCUMENTS

2010/0313849 A1* 12/2010 Stoner .................... F02D 41/22
123/350
2011/0257824 A1* 10/2011 Couchene .............. B60K 26/00
701/22

FOREIGN PATENT DOCUMENTS

JP 2014-118072 A 6/2014

* cited by examiner

*Primary Examiner* — Tan Q Nguyen
(74) *Attorney, Agent, or Firm* — Westerman, Hattori, Daniels & Adrian, LLP (57) ABSTRACT

A vehicle control system includes: multiple control units which controls operation of a vehicle including an internal combustion engine, a first electric motor connected to the internal combustion engine, and a second electric motor; and a network connected to the control units such that the control units perform communication with each other. The control units include a first control unit which controls the internal combustion engine, a second control unit which controls the first motor, and a third control unit which controls the second motor, and each detect abnormality in communication via the network among the control units. Upon detection of abnormality in communication between the second control unit and the other control units via the network, the first control unit stops operation of the internal combustion engine, and the third control unit performs control such that the second motor outputs power for the vehicle to travel.

11 Claims, 5 Drawing Sheets

VEHICLE CONTROL SYSTEM

CROSS REFERENCES TO RELATED APPLICATIONS

The present application claims priority under 35 U.S.C. § 119 to Japanese Patent Application No. 2016-100790, filed May 19, 2016, entitled "Vehicle Control System." The contents of this application are incorporated herein by reference in their entirety.

TECHNICAL FIELD

The present disclosure relates to a vehicle control system including multiple control units and communication networks for performing travel control of a hybrid vehicle having wheels driven by an internal combustion engine and an electric motor.

BACKGROUND

Among conventional vehicle control systems for hybrid vehicles that include an internal combustion engine and a motor (hereinafter, a driving motor) that are both used for driving wheels, there is known a vehicle control system that is capable of, even when a communication network fails, continuing necessary communication by way of a simple configuration and processing and allowing the driving motor to continuously perform wheel driving, the vehicle control system including: multiple electronic control units (ECUs) including a motor control ECU to control the driving motor and a management ECU to control devices other than the driving motor; and two independent networks, i.e., first and second communication networks each built with an independent Controller Area Network (CAN) bus (see, for example, Japanese Unexamined Patent Application Publication No. 2014-118072).

In this vehicle control system, the transmission rate of the second communication network is lower than the transmission rate of the first communication network, and the ECUs transmit and receive travel data essential for travel control and data for improving travel comfortability (hereinafter, comfortability improvement data) via the first communication network, and the ECUs transmit and receive the aforementioned travel data via the second communication network. Then, when both the first and second communication networks are functioning normally, the motor control ECU receives both the travel data and the comfortability improvement data and performs comfortability-oriented travel control. If the first communication network fails, the motor control ECU receives only the travel data via the second communication network and performs only the functions essential for traveling while sacrificing travel comfortability.

Thus, if the first communication network fails, this vehicle control system can cope with the communication network failure simply by changing only reception processing of the ECUs (i.e., changing to receiving and using only the travel data received from the second communication network) without changing transmission processing.

SUMMARY

If both the first and second communication networks fail, the above-described vehicle control system in Japanese Unexamined Patent Application Publication No. 2014-118072 cannot transmit or receive the travel data essential for travel control between the ECUs including the motor control ECU and the management ECU. In this case, the hybrid vehicle cannot travel while being controlled in accordance with the travel data.

The present disclosure provides, for example, a vehicle control system capable of continuing traveling while being controlled in accordance with travel data even when an abnormality occurs in the communication between control units via communication networks.

A first aspect of the present disclosure describes a vehicle control system including a plurality of control units which control operation of a vehicle including an internal combustion engine (for example, an internal combustion engine 102 in the embodiments described below) capable of driving a first wheel (for example, a first wheel 101A in the embodiments described below) which is one of a front wheel and a rear wheel, a first electric motor (for example, a first electric motor 103 in the embodiments described below) connected to the internal combustion engine, and a second electric motor (for example, a second electric motor 107 in the embodiments described below) driving a second wheel (for example, a second wheel 101B in the embodiments described below) which is the other one of the front wheel and the rear wheel, and a communication network (for example, a first communication network 140 and a second communication network 142 in the embodiments described below) which is connected to the plurality of control units to connect the plurality of control units to each other such that communication is performed between the control units. The plurality of control units include a first control unit (for example, a management ECU 120 in the embodiments described below) which controls operation of the internal combustion engine, a second control unit (for example, a first control ECU 122 in the embodiments described below) which controls operation of the first electric motor, and a third control unit (for example, a second control ECU 126 in the embodiments described below) which controls operation of the second electric motor, the plurality of control units each detect occurrence of abnormality in communication among the plurality of control units via the communication network, and when occurrence of abnormality is detected in the communication of the second control unit with the other control units via the communication network, the first control unit stops the operation of the internal combustion engine, and the third control unit performs control such that the second electric motor outputs power for the vehicle to travel.

In a second aspect of the present disclosure according to the first aspect of the present disclosure, the vehicle includes an engage portion (for example, a transmission 104 in the embodiments described below) provided on a power transmission path between the first electric motor and the first wheel, the engage portion configured to be disengaged to disconnect a first electric motor side and a first wheel side from each other, and to be engaged to connect the first electric motor side and the first wheel side to each other, the plurality of control units include a fourth control unit (for example, an ECU 124 in the embodiments described below) which controls the engage portion, and when occurrence of abnormality is detected in the communication, the fourth control unit disengages the engage portion, and the third control unit performs control such that the second electric motor outputs the power for the vehicle to travel after the engage portion is completely disengaged.

In a third aspect of the present disclosure according to the second aspect of the present disclosure, when occurrence of abnormality is detected in the communication, the first control unit instructs the fourth control unit to disengage the engage portion after torque of the internal combustion engine falls below a predetermined value.

In a fourth aspect of the present disclosure according to the first to third aspects of the present disclosure, the second control unit controls operation of a converter (for example, a first inverter 105 in the embodiments described below) which performs a switching operation to convert electric power generated by the first electric motor or electric power for driving the first electric motor, and when occurrence of abnormality is detected in the communication, the second control unit controls and switches off all switching elements included in the converter.

In a fifth aspect of the present disclosure according to the first to fourth aspects of the present disclosure, the communication network includes a first communication network (for example, the first communication network 140 in the embodiments described below) and a second communication network (for example, the second communication network 142 in the embodiments described below), each of which is connected to the plurality of control units to connect the control units to each other such that communication is performed between the control units, and the abnormality in the communication is an abnormality in both the communication between the second control unit and the other control units via the first communication network and the communication between the second control unit and the other control units via the second communication network.

A sixth aspect of the present disclosure describes a vehicle control system, including a plurality of control units which control operation of a vehicle including an internal combustion engine (for example, the internal combustion engine 102 in the embodiments described below) capable of driving a first wheel (for example, the first wheel 101A in the embodiments described below) which is one of a front wheel and a rear wheel, a first electric motor (for example, the first electric motor 103 in the embodiments described below) connected to the internal combustion engine, and a second electric motor (for example, a second electric motor 107 in the embodiments described below) driving a second wheel (for example, a second wheel 101B in the embodiments described below) which is the other one of the front wheel and the rear wheel, and a communication network (for example, the first communication network 140 and the second communication network 142 in the embodiments described below) connected to the plurality of control units to connect the plurality of control units to each other such that communication is performed between the control units. The plurality of control units include a first control unit (for example, the management ECU 120 in the embodiments described below) which controls the internal combustion engine, a second control unit (for example, the first control ECU 122 in the embodiments described below) which controls the first electric motor, and a third control unit (for example, the second control ECU 126 in the embodiments described below) which controls the second electric motor. The first control unit detects occurrence of abnormality in the second control unit, and when occurrence of abnormality of the second control unit is detected, the first control unit stops operation of the internal combustion engine, and the third control unit performs control such that the second electric motor outputs power for the vehicle to travel.

In a seventh aspect of the present disclosure according to the six aspect of the present disclosure, the vehicle includes an engage portion provided on a power transmission path between the first electric motor and the first wheel, the engage portion configured to be disengaged to disconnect a first electric motor side and a first wheel side from each other and to be engaged to connect the first electric motor side and the first wheel side to each other, the plurality of control units include a fourth control unit (for example, an ECU 124 in the embodiments described below) which controls the engage portion, and when occurrence of abnormality in the second control unit is detected, the fourth control unit disengages the engage portion, and the third control unit performs control such that the second electric motor outputs power for the vehicle to travel after the engage portion is completely disengaged.

In an eighth aspect of the present disclosure according to the seventh aspect of the present disclosure, when occurrence of abnormality in the second control unit is detected, the first control unit instructs the fourth control unit to disengage the engage portion after torque of the internal combustion engine falls below a predetermined value.

According to the first aspect of the present disclosure, even if the other control unit becomes unable to provide an instruction or the like to the second control unit due to the occurrence of abnormality in communication between the second control unit and the other control unit via the communication network, the vehicle can stop the operation of the internal combustion engine to avoid the influence of corotation of the first electric motor and continue traveling while being controlled by power from the second electric motor.

If the second electric motor is controlled after the engage portion is completely disengaged as in the second aspect of the present disclosure, the output of the internal combustion engine does not overlap with the output of the second electric motor. Therefore, while having a stable output, the vehicle can switch to a travel mode in which the power of the second electric motor is used.

If the engage portion is disengaged after the torque of the internal combustion engine falls below the predetermined value as in the third aspect of the present disclosure, it becomes possible to prevent an abrupt variation in output during switching to the travel mode in which the power of the second electric motor is used.

According to the fourth aspect of the present disclosure, the output side of the first electric motor is switched to an open circuit by the converter in which all the switching elements are switched off, which makes it possible to avoid the influence of electric power generated by corotation of the first electric motor before operation of the internal combustion engine is completely stopped.

According to the fifth aspect of the present disclosure, even if the other control unit becomes unable to provide an instruction or the like to the second control unit, even in a dual communication environment among the control units, due to the occurrence of abnormality in communication over both networks, the vehicle can stop operation of the internal combustion engine to avoid the influence of corotation of the first electric motor and continue traveling while being controlled by power from the second electric motor.

According to the sixth aspect of the present disclosure, even if the other control unit becomes unable to provide an instruction or the like to the second control unit due to the occurrence of abnormality in the second control unit, the vehicle can stop operation of the internal combustion engine to avoid the influence of corotation of the first electric motor and continue traveling while being controlled by power from the second electric motor.

If the second electric motor is controlled after the engage portion is completely disengaged as in the seventh aspect of the present disclosure, the output of the internal combustion engine does not overlap with the output of the second electric motor. Therefore, while having a stable output, the vehicle can switch to the travel mode in which the power of the second electric motor is used.

According to the eighth aspect of the present disclosure, a transmission path is disengaged after the torque of the internal combustion engine falls below the predetermined value, which makes it possible to prevent an abrupt variation in the output during switching to the travel mode in which the power of the second electric motor is used. In the above explanation of the exemplary embodiment, specific elements with their reference numerals are indicated by using brackets. These specific elements are presented as mere examples in order to facilitate understanding, and thus, should not be interpreted as any limitation to the accompanying claims.

BRIEF DESCRIPTION OF THE DRAWINGS

The advantages of the disclosure will become apparent in the following description taken in conjunction with the following drawings.

DESCRIPTION OF THE PREFERRED EMBODIMENTS

With reference to the drawings, embodiments of the present disclosure are described hereinafter.

First Embodiment

Figure 1:
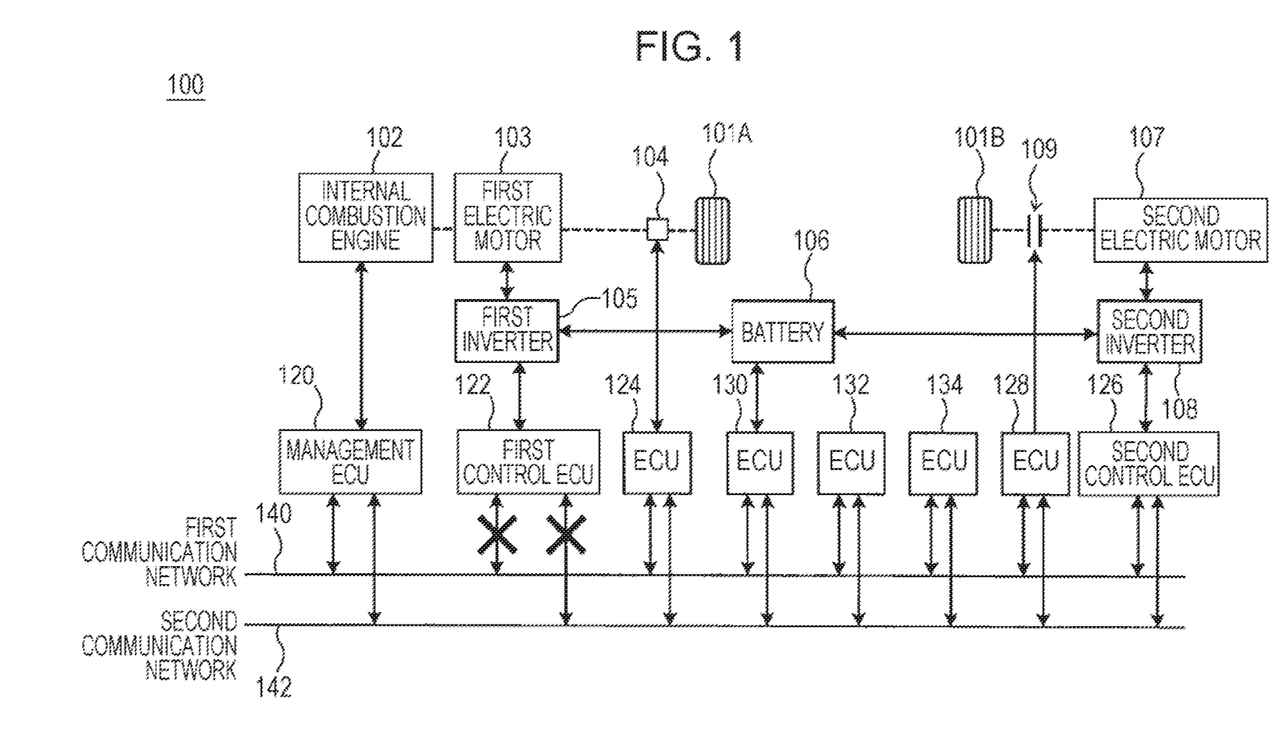
FIG. 1 illustrates a configuration and an abnormal state of a vehicle control system according to a first embodiment of the present disclosure.

FIG. 1 illustrates a configuration and an abnormal state of a vehicle control system according to a first embodiment of the present disclosure. A vehicle control system 100 of the first embodiment is mounted on a hybrid vehicle and controls an internal combustion engine 102 to drive a first wheel 101A which is one of a front wheel and a rear wheel of the hybrid vehicle, a first electric motor 103 connected to the internal combustion engine 102, and a second electric motor 107 to drive a second wheel 101B which is the other one of the front wheel or the rear wheel.

In the vehicle control system 100, the internal combustion engine 102 and the first electric motor 103 are connected to each other inseparably, and the first electric motor 103 is connected to the first wheel 101A via a transmission 104. The transmission 104 is configured to control a power transmission path between the first electric motor 103 and the first wheel 101A under the control of an ECU 124 described below so as to disconnect or connect the power transmission path. For example, the transmission 104 is provided with an engage portion such as a clutch and a brake, and disconnects or connects the power transmission path by disengaging or engaging the engage portion. Electric power to drive the first electric motor 103 from a battery 106 is converted by a first inverter 105 and then supplied to the first electric motor 103, and electric power generated by the first electric motor 103 along with operation of the internal combustion engine 102 is converted by the first inverter 105 and then used to charge the battery 106. The first inverter 105 has multiple switching elements and performs electric power conversion by a switching operation under the control of a first control ECU 122 described below.

The second electric motor 107 operates by receiving electric power supplied from the battery 106 and converted by a second inverter 108. Moreover, the second electric motor 107 generates electric power by performing a regenerative operation during deceleration cruising of the hybrid vehicle. The second inverter 108 has multiple switching elements and performs electric power conversion by a switching operation under the control of a second control ECU 126 described below. The second wheel 101B is connected to the second electric motor 107 via a clutch 109. The clutch 109 controls a power transmission path between the second electric motor 107 and the second wheel 101B under the control of an ECU 128 described below so as to disconnect or connect the power transmission path.

The vehicle control system 100 has multiple electronic control units (ECUs) 120, 122, 124, 126, 128, 130, 132, and 134 to control operation of the vehicle, and a first communication network 140 and a second communication network 142 each independently connect these ECUs to each other such that communication may be performed between the control units.

Each ECU mentioned above generates travel control information which is real-time information required for real-time control for vehicle traveling (for example, information that needs to be reflected to the travel control immediately) at first predetermined time intervals. Further, each ECU mentioned above generates travel management information which is information other than the real-time information and relates to travel operation (for example, monitoring information of a travel operation state, and setting information affecting the travel control or the like), for example, at second predetermined time intervals longer than the first predetermined time intervals. Examples of the travel control information and the travel management information output by each ECU will be described later.

Moreover, each ECU mentioned above transmits to another ECU at least one of the travel control information and the travel management information generated via at least one of the first communication network 140 and the second communication network 142 and receives at least one of the travel control information and the travel management information generated by the other ECU via at least one of the first communication network 140 and the second communication network 142.

The ECUs monitor occurrence of abnormality in communication between the ECUs via the first communication network 140 or the second communication network 142 and detect occurrence of abnormality in communication between the ECUs. For example, each ECU transmits pilot signals to the other ECUs to monitor the occurrence of abnormality, and if there is a certain ECU from which an ACK signal to the pilot signal cannot be received, another ECU determines that an abnormality has disabled the certain ECU from communicating. Moreover, an ECU having an abnormality that disables communication determines that the abnormality occurred in its communication since the ECU was unable to receive ACK signals from the other ECUs, even after transmitting the pilot signals to the other ECUs.

The first communication network 140 and the second communication network 142 are two independent networks each of which connects the ECUs 120, 122, 124, 126, 128, 130, 132, and 134 to each other such that communication may be performed therebetween, and the first communication network 140 and the second communication network 142 are configured by two independent Controller Area Network (CAN) buses, for example, in compliance with CAN communication standards.

Moreover, the first communication network 140 has a higher communication speed than the second communication network 142 and is used mainly for transmission of the travel control information described above. The second communication network 142 is used mainly for transmission of the travel management information described above.

The ECU 120 is a management control unit for comprehensively managing and controlling all vehicle control operations. For example, in accordance with a load state in the vehicle traveling (such as acceleration corresponding to accelerator pedal depression amount), the ECU 120 determines the torque balance for driving the wheels among the torque to be generated by the internal combustion engine 102, the torque to be generated by the first electric motor 103, and the torque to be generated by the second electric motor 107 and determines start/stop timing of the energy regenerative operation for regenerating energy from the first electric motor 103 or the second electric motor 107 to the battery 106. Hereinafter, the ECU 120 is also referred to as the management ECU 120.

In the first embodiment, the management ECU 120 also functions as an ECU for controlling operation of the internal combustion engine 102 and functions additionally as a so-called Fuel Injection ECU (FI-ECU) to control fuel injection and other operations of the internal combustion engine 102, for example. The management ECU 120 receives the travel control information transmitted from, for example, the ECU 122 described below, comprehensively manages and controls all vehicle control operations in accordance with the received travel control information and so on, and controls the operation of the internal combustion engine 102.

As the travel control information, the management ECU 120 outputs the real-time information including information on required torque to the internal combustion engine 102, the first electric motor 103, and the second electric motor 107 in accordance with, for example, the above mentioned torque balance determination (including instructions to start/stop an operation to generate torque) and information required for cooperation of at least two of the first electric motor 103, the second electric motor 107, and internal combustion engine 102 (for example, engine speed of the internal combustion engine 102). Moreover, the management ECU 120 outputs, for example, information indicating an operation state of the internal combustion engine 102 (temperature, fuel consumption, and so on of the internal combustion engine 102) as the travel management information.

The ECU 122 is a control unit for controlling operation of the first electric motor 103 via the first inverter 105. Hereinafter, the ECU 122 is also referred to as the first control ECU 122. The first control ECU 122 receives the travel control information transmitted from, for example, the management ECU 120 and controls the operation of the first electric motor 103 in accordance with the received travel control information.

The first control ECU 122 outputs, for example, information required for real-time calculation of the torque balance in the management ECU 120 (such as torque generated by the first electric motor 103) as the travel control information. Moreover, the first control ECU 122 outputs information illustrating an operation state of the first electric motor 103 (for example, temperature and current generated by the first electric motor 103) as the travel management information.

The ECU 124 controls operation of the transmission 104. The ECU 124 receives the travel control information transmitted from, for example, the management ECU 120 and controls the power transmission path between the first electric motor 103 and the first wheel 101A so as to disconnect or connect the power transmission path in accordance with the received travel control information.

The ECU 124 outputs information on a state of the power transmission path in the transmission 104 (for example, a disconnected state or a connected state) as the travel control information.

The ECU 126 is a control unit for controlling operation of the second electric motor 107 via the second inverter 108. Hereinafter, the ECU 126 is also referred to as the second control ECU 126. The second control ECU 126 receives the travel control information transmitted from, for example, the management ECU 120 and controls the operation of the second electric motor 107 in accordance with the received travel control information.

The second control ECU 126 outputs, for example, information required for real-time calculation of the torque balance in the management ECU 120 (such as rotation speed and torque generated by the second electric motor 107) as the travel control information. Moreover, the second control ECU 126 outputs information illustrating an operation state of the second electric motor 107 (such as temperature and generating current value of the second electric motor 107) as the travel management information.

The ECU 128 controls operation of the clutch 109. The ECU 128 receives the travel control information transmitted from, for example, the management ECU 120 and engages or disengages the clutch 109 in accordance with the received the travel control information.

The ECU 128 outputs information on a state of the clutch 109 (such as a disengaged state and an engaged state) as the travel control information.

The ECU 130 manages operation for the battery 106. For example, the ECU 130 monitors the remaining charge amount (remaining battery amount) of the battery 106 and determines the necessity of charging the battery 106 and so on.

The ECU 130 outputs, for example, information on a battery output voltage required for the operation of the second electric motor 107 and other information as the travel control information. Moreover, The ECU 130 outputs charging request information to request charging to the battery 106, remaining battery amount information, residual decrease speed information, and other information as the travel management information.

The ECU 132 detects brake pedal (not illustrated) depression amount, and controls a wheel brake in accordance with the travel control information including the detected brake pedal depression amount, occurrence of slip of a wheel transmitted from another ECU, rolling motion of a vehicle body, and the like. The ECU 132 outputs, for example, information on the above mentioned brake pedal depression amount as the travel control information.

The ECU 134 detects the accelerator pedal (not illustrated) depression amount, outputs the travel control information based on the detected accelerator pedal depression amount.

Here, if the first control ECU 122 cannot transmit or receive the travel control information or the travel management information to and from the other ECUs due to the occurrence of abnormality in communication between the first control ECU 122 and the other ECUs via the first communication network 140 or the second communication network 142, the ECU detects the occurrence of abnormality, the management ECU 120 stops the operation of the internal combustion engine 102, and the second control ECU 126 performs control such that only the second electric motor 107 outputs power for the hybrid vehicle to travel.

Figure 2:
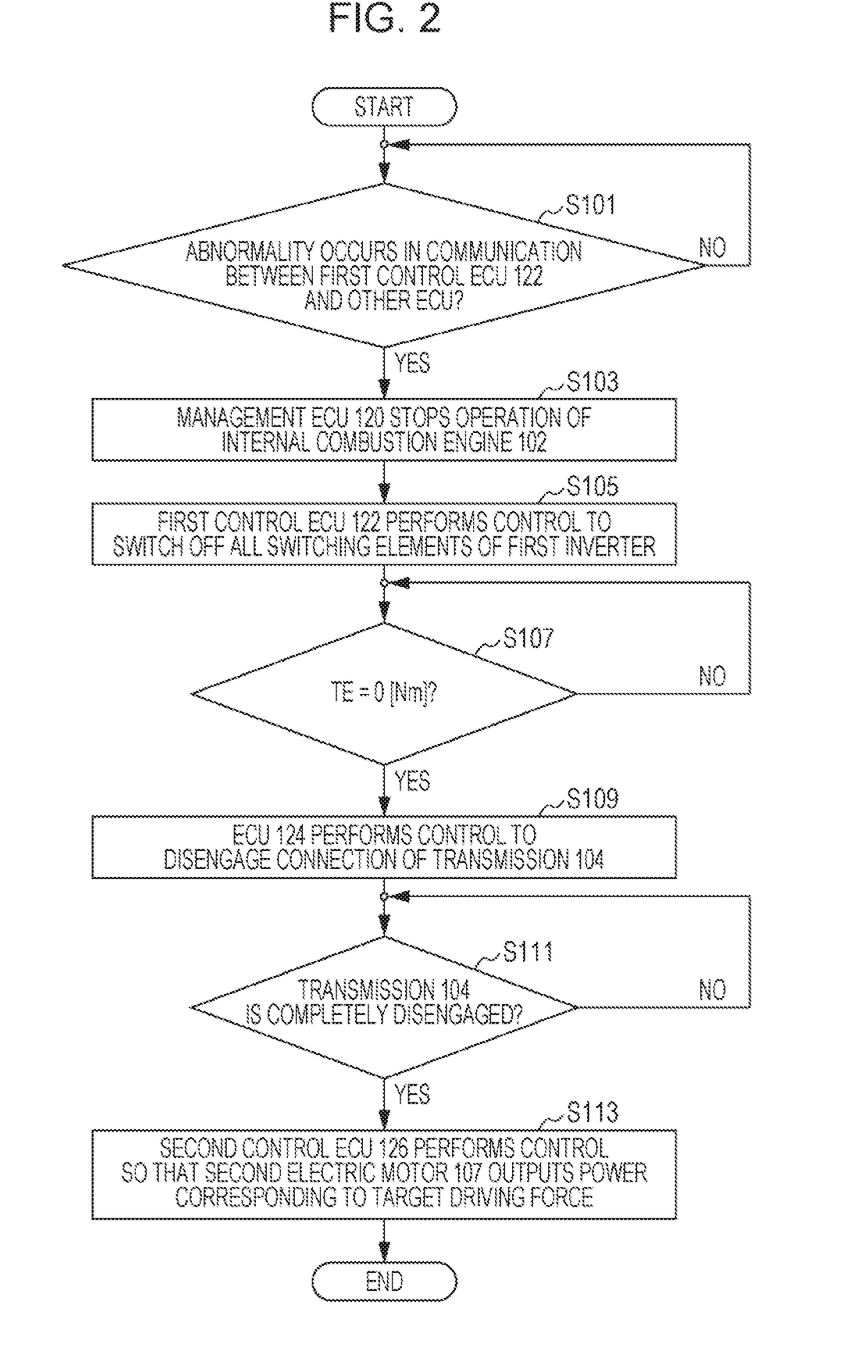
FIG. 2 is a flow chart illustrating operation of the vehicle control system of the first embodiment in the case of an occurrence of an abnormal state where a power generation control ECU cannot communicate with other ECUs.
Figure 3:
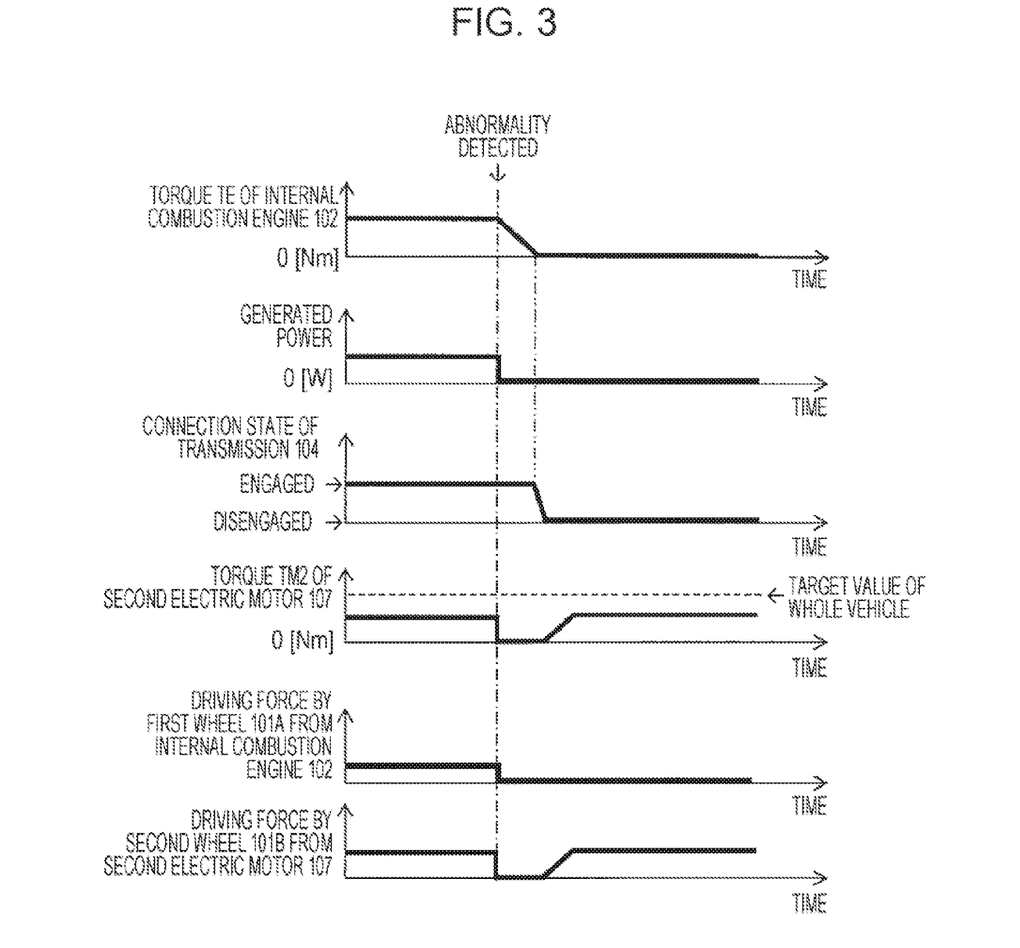
FIG. 3 is a time chart illustrating a state transition of each component in the case of an occurrence of an abnormal state where the power generation control ECU cannot communicate with the other ECUs.

Referring to FIGS. 2 and 3, description is provided below for the details of operation of the vehicle control system 100 of the first embodiment in the occurrence of an abnormal state where the first control ECU 122 cannot communicate with the other ECUs. FIG. 2 is a flow chart illustrating operation of the vehicle control system of the first embodiment in the occurrence of an abnormal state where the first control ECU 122 cannot communicate with other ECUs. FIG. 3 is a time chart illustrating a state transition of each component in the occurrence of an abnormal state where the first control ECU 122 cannot communicate with the other ECUs.

The ECUs determine whether an abnormality occurs in communication between the first control ECU 122 and the other ECUs (step S101), and the operation proceeds to step S103 if the occurrence of abnormality is detected. At step S103, the management ECU 120 stops the operation of the internal combustion engine 102. Moreover, if the second electric motor 107 is operated, the second control ECU 126 stops the operation of the second electric motor 107. Thus, when the occurrence of abnormality above is detected, as illustrated in FIG. 3, both of torque TE of the internal combustion engine 102 and torque TM2 of the second electric motor 107 are controlled to be 0 [Nm]. In addition, in the first embodiment, since the internal combustion engine 102 and the first electric motor 103 are connected to each other inseparably, driving of the first electric motor 103 is also stopped when the operation of the internal combustion engine 102 is stopped.

Moreover, almost simultaneously with step S103, the first control ECU 122 controls and switches off all the switching elements of the first inverter 105 (step S105). Since the driving of the first electric motor 103 is also stopped by the stoppage of the operation of the internal combustion engine 102 and all the switching elements of the first inverter 105 are controlled and switched off, electric power generated by the first electric motor 103 becomes 0 [W] as illustrated in FIG. 3.

Next, the management ECU 120 determines whether the torque TE of the internal combustion engine 102 becomes 0 [Nm] (step S107). When the torque TE=0 [Nm], the operation proceeds to step S109. Instead, at step S107, the management ECU 120 may estimate that the torque TE=0 [Nm] a predetermined period of time after the processing of stopping the operation of the internal combustion engine 102 at step S103, and then the operation may proceed to step S109. Moreover, the torque TE for determining to proceed to step S109 is not limited to 0 [Nm], but may be any predetermined value close to 0 [Nm]. At step S109, the management ECU 120 instructs the ECU 124 to disconnect a power transmission path in the transmission 104 between the first electric motor 103 and the first wheel 101A, and the ECU 124 disengages the engage portion provided in the transmission 104.

Next, the ECU 124 determines whether the engage portion provided in the transmission 104 is completely disengaged (step S11), and the operation proceeds to step S113 when the disengagement is completed. Instead, at step S111, the ECU 124 may estimate that the disengagement of the engage portion is completed a predetermined period of time after the disengage processing of the engage portion of the transmission 104 at step S109, and then the operation may proceed to step S113. At step S113, the second control ECU 126 controls the second inverter 108 such that the second electric motor 107 outputs power corresponding to target driving force based on a vehicle speed, accelerator pedal depression amount, and so on of a hybrid vehicle. As a result, the hybrid vehicle travels only by using the output by the second electric motor 107. In addition, in the example illustrated in FIG. 3, the torque of the second electric motor 107 after the abnormality detection is controlled to be below the target value in consideration of the remaining charge amount of the battery 106.

As described above, according to the first embodiment, even if the other control units become unable to provide instructions and the like to the first control ECU 122 due to the occurrence of abnormality in the communication between the first control ECU 122 and the other ECUs via the first communication network 140 or the second communication network 142, the vehicle can stop the operation of the internal combustion engine 102 to avoid the influence of corotation of the first electric motor 103, and continue traveling while being controlled only by the power from the second electric motor 107.

Moreover, in the first embodiment, since the second electric motor 107 is controlled after the operation of the internal combustion engine 102 is stopped and the engage portion in the transmission 104 is completely disengaged, the output of the internal combustion engine 102 does not overlap with the output of the second electric motor 107. Therefore, while having a stable output, the vehicle can switch to a travel mode in which only the power of the second electric motor 107 is used.

Moreover, the connection in the transmission 104 is disengaged after the torque TE of the internal combustion engine 102 becomes 0 [Nm], which makes it possible to prevent an abrupt variation in the driving force during switching to the travel mode in which only the power of the second electric motor 107 is used.

Moreover, when the internal combustion engine 102 is stopped due to the occurrence of abnormality, all the switching elements of the first inverter 105 serving for the first electric motor 103 are switched off. Thus, the output side of the first electric motor 103 is turned to an open circuit and the vehicle is not influenced by the electric power generated by corotation of the first electric motor 103 before the operation of the internal combustion engine 102 is completely stopped.

Second Embodiment

Figure 4:
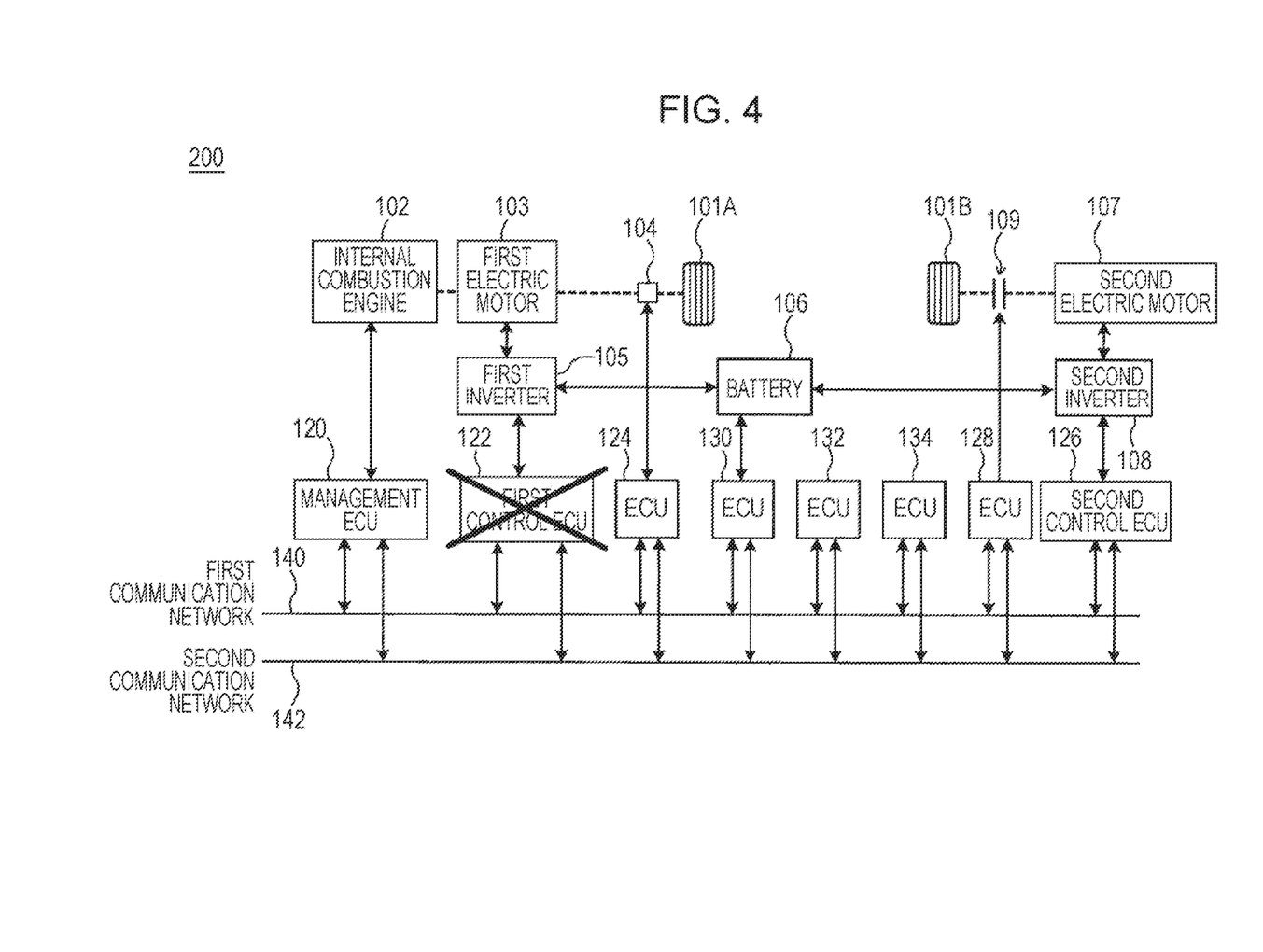
FIG. 4 illustrates a configuration and an abnormal state of a vehicle control system according to a second embodiment of the present disclosure.

FIG. 4 illustrates a configuration and an abnormal state of a vehicle control system according to a second embodiment of the present disclosure. The configuration of a vehicle control system 200 is similar to that of the vehicle control system 100 of the first embodiment. The abnormal state of the second embodiment is different from the first embodiment, and is a failure of a first control ECU 122 itself. In the second embodiment, each ECU monitors the states of the other ECUs to detect a failure in the ECUs themselves. In addition, if there is an ECU from which an ACK signal to the pilot signal cannot be received, the ECU determines that that ECU fails.

Figure 5:
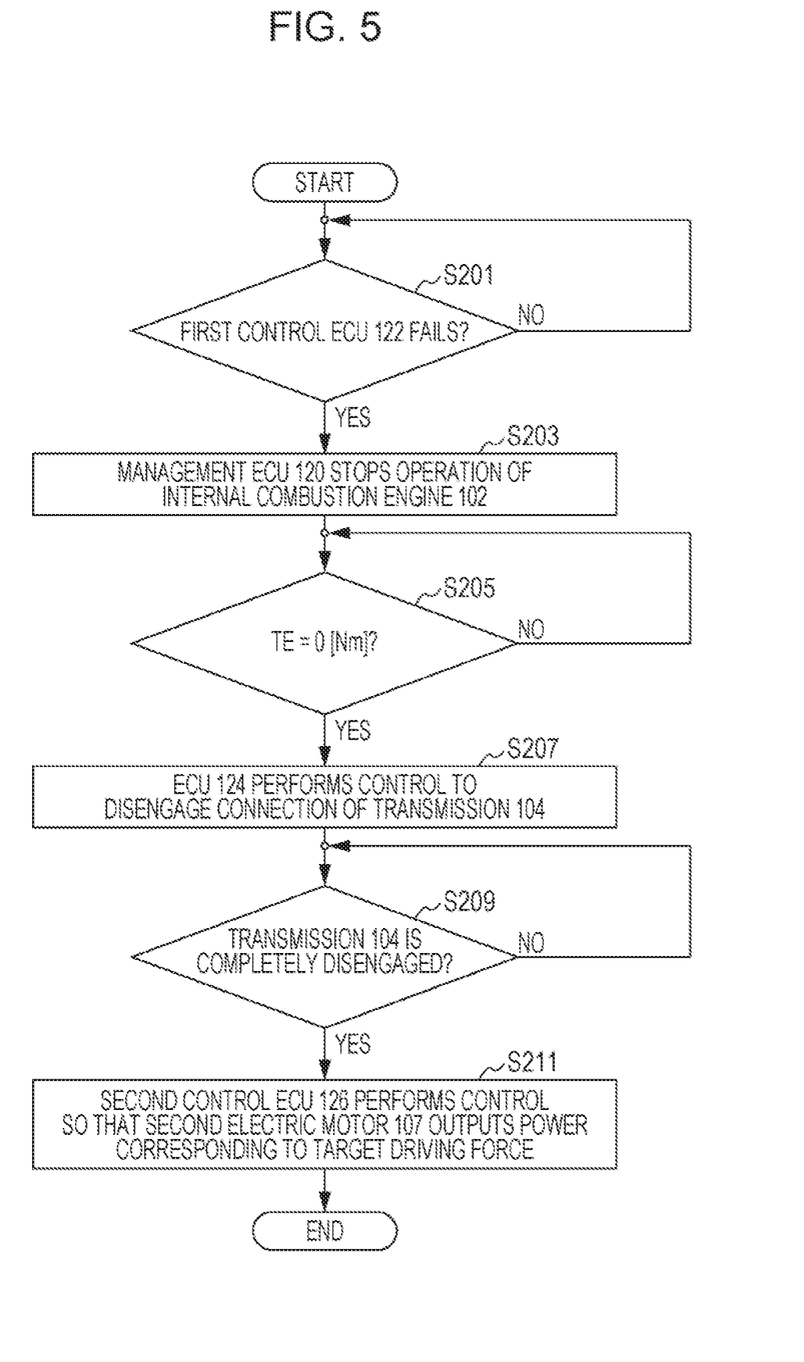
FIG. 5 is a flow chart illustrating operation of the vehicle control system according to the second embodiment in the case of an occurrence of an abnormal state where a power generation control ECU cannot communicate with the other ECUs.

Referring to FIG. 5, description is provided below for the details of operation of the vehicle control system 200 of the second embodiment in the case where the first control ECU 122 fails. FIG. 5 is a flow chart illustrating a configuration and an abnormal state of the vehicle control system 200 according to the second embodiment in the occurrence of an abnormal state which disables the first control ECU 122 from communicating with the other ECUs.

The ECUs determine whether the first control ECU 122 fails (step S201), and the operation proceeds to step S203 if the failure is detected. At step S203, the management ECU 120 stops operation of an internal combustion engine 102. Moreover, if a second electric motor 107 is operated, a second control ECU 126 stops operation of the second electric motor 107. Thus, if the failure of the first control ECU 122 is detected, torque of the internal combustion engine 102 and torque of the second electric motor 107 are both controlled to be 0 [Nm]. In addition, in the second embodiment, since the internal combustion engine 102 and a first electric motor 103 are connected to each other inseparably, driving of the first electric motor 103 is also stopped when the operation of the internal combustion engine 102 is stopped.

Next, the management ECU 120 determines whether the torque TE of the internal combustion engine 102 becomes 0 [Nm] (step S205), and the operation proceeds to step S207 when the torque TE=0 [Nm]. Instead, at step S205, the management ECU 120 may estimate that the torque TE=0 [Nm] a predetermined period of time after the processing of stopping the operation of the internal combustion engine 102 at step S203, and then the operation may proceed to step S207. Moreover, the torque TE for determining to proceed to step S207 is not limited to 0 [Nm], but may be a predetermined value close to 0 [Nm]. At step S207, the management ECU 120 instructs an ECU 124 to disconnect a power transmission path between the first electric motor 103 and a first wheel 101A in a transmission 104, and the ECU 124 disengages an engage portion provided in the transmission 104.

Next, the ECU 124 determines whether the disengagement of the transmission 104 is completed (step S209), and the operation proceeds to step S211 if the disengagement is completed. Instead, at step S209, the ECU 124 may estimate that the disengagement is completed a predetermined period of time after the disengagement processing of the transmission 104 at step S207, and then the operation may proceed to step S211. At step S211, the second control ECU 126 controls a second inverter 108 such that the second electric motor 107 outputs power corresponding to a target driving force based on a vehicle speed, accelerator pedal depression amount, and so on of a hybrid vehicle. As a result, the hybrid vehicle travels only by using the output from the second electric motor 107.

As described above, according to the second embodiment, even if the first control ECU 122 fails and cannot control the operation of the first electric motor 103, the hybrid vehicle can stop the operation of the internal combustion engine 102 to avoid influence of corotation of the first electric motor 103 and continue traveling while being controlled only by the power from the second electric motor 107.

Moreover, in the second embodiment, since the second electric motor 107 is controlled after the operation of the internal combustion engine 102 is stopped and the disengagement of the engage portion in the transmission 104 is completed, the output of the internal combustion engine 102 does not overlap with the output of the second electric motor 107. Therefore, while having a stable output, the vehicle can switch to the travel mode in which only the power of the second electric motor 107 is used.

Moreover, the connection in the transmission 104 is disengaged after the torque TE of the internal combustion engine 102 becomes 0 [Nm], which makes it possible to prevent an abrupt variation in the driving force during switching to the travel mode in which only the power of the second electric motor 107 is used.

The present disclosure is not intended to be limited to the embodiments described above, and may be altered with suitable modifications, improvements, or the like. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A vehicle control system, comprising:
a plurality of controllers which control operation of a vehicle including an internal combustion engine configured to drive a first wheel which is one of a front wheel and a rear wheel, a first electric motor connected to the internal combustion engine, and a second electric motor driving a second wheel which is the other one of the front wheel and the rear wheel; and
a communication network which is connected to the plurality of controllers to interconnect the plurality of controllers to each other such that communication is performed between the controllers, wherein
the plurality of controllers include a first controller which controls the internal combustion engine, a second controller which controls the first electric motor, and a third controller which controls the second electric motor,
the plurality of controllers each detect occurrence of abnormality in communication among the plurality of controllers via the communication network, and
when occurrence of abnormality is detected in the communication of the second controller with the other controllers via the communication network, the first controller stops operation of the internal combustion engine, and the third controller performs control such that the second electric motor outputs power for the vehicle to travel.

2. The vehicle control system according to claim 1, wherein
the vehicle includes an engage portion provided on a power transmission path between the first electric motor and the first wheel, the engage portion configured to be disengaged to disconnect the first electric motor and the first wheel from each other, and to be engaged to connect the first electric motor and the first wheel to each other;

the plurality of controllers include a fourth controller which controls the engage portion; and when the occurrence of the abnormality is detected in the communication, the fourth controller disengages the engage portion, and the third controller performs control such that the second electric motor outputs the power for the vehicle to travel after the engage portion is completely disengaged.

3. The vehicle control system according to claim 2, wherein
when the occurrence of the abnormality is detected in the communication, the first controller instructs the fourth controller to disengage the engage portion after torque of the internal combustion engine falls below a predetermined value.

4. The vehicle control system according to claim 2, wherein when the occurrence of the abnormality is detected, the third controller performs control such that the second electric motor does not output the power for the vehicle to travel until the engage portion is completely disengaged.

5. The vehicle control system according to claim 1, wherein
the second controller controls operation of a converter which performs a switching operation by switching elements to convert electric power generated by the first electric motor or electric power for driving the first electric motor, and
when the occurrence of the abnormality is detected in the communication, the second controller switches off all switching elements included in the converter.

6. The vehicle control system according to claim 1, wherein
the communication network includes a first communication network and a second communication network, each of which is connected to the respective plurality of controllers to interconnect the controllers to each other such that communication is performed between the controllers, and
the abnormality in the communication is an abnormality in both the communication of the second controller with the other controllers via the first communication network and the communication of the second controller with the other controllers via the second communication network.

7. The vehicle control system according to claim 1, wherein
the communication network includes a plurality of communication networks, each being connected to the respective plurality of controllers to interconnect the controllers to each other such that communication is performed between the controllers, and
the abnormality in the communication is an abnormality in the communication of the second controller with the other controllers via the respective communication networks.

8. A vehicle control system, comprising:
a plurality of controllers which control operation of a vehicle including an internal combustion engine configured to drive a first wheel which is one of a front wheel and a rear wheel, a first electric motor connected to the internal combustion engine, and a second electric motor driving a second wheel which is the other one of the front wheel and the rear wheel; and
a communication network connected to the plurality of controllers to interconnect the plurality of controllers to each other such that communication is performed between the controllers, wherein
the plurality of controllers include a first controller which controls the internal combustion engine, a second controller which controls the first electric motor, and a third controller which controls the second electric motor,
the first controller detects occurrence of abnormality in the second controller, and
when occurrence of abnormality in the second controller is detected, the first controller stops operation of the internal combustion engine, and the third controller performs control such that the second electric motor outputs power for the vehicle to travel.

9. The vehicle control system according to claim 8, wherein
the vehicle includes an engage portion provided on a power transmission path between the first electric motor and the first wheel, the engage portion configured to be disengaged to disconnect the first electric motor and the first wheel from each other and to be engaged to connect the first electric motor and the first wheel to each other,
the plurality of controllers include a fourth controller which controls the engage portion, and
when the occurrence of the abnormality in the second controller is detected, the fourth controller disengages the engage portion, and the third controller performs control such that the second electric motor outputs power for the vehicle to travel after the engage portion is completely disengaged.

10. The vehicle control system according to claim 9, wherein
when the occurrence of the abnormality in the second controller is detected, the first controller instructs the fourth controller to disengage the engage portion after torque of the internal combustion engine falls below a predetermined value.

11. The vehicle control system according to claim 1, wherein when the occurrence of the abnormality is detected, the first controller stops the operation of the internal combustion engine, and the third controller performs control such that the second electric motor solely outputs the power for the vehicle to travel.

* * * * *